United States Patent [19]

Langley

[11] Patent Number: 4,598,536

[45] Date of Patent: Jul. 8, 1986

[54] BAG ATTACHMENT AND LAWN MOWER APPARATUS

[76] Inventor: Burton Langley, Rte. 9, Hickory La., Elizabethtown, Ky. 42701

[21] Appl. No.: 498,417

[22] Filed: May 26, 1983

[51] Int. Cl.$^4$ ........................................... A01D 35/22
[52] U.S. Cl. ........................................ 56/202; 56/16.6
[58] Field of Search .................. 56/16.6, 202; 248/99, 248/100, 101; 285/254, 260

[56] References Cited

U.S. PATENT DOCUMENTS

| | | | |
|---|---|---|---|
| 868,269 | 10/1907 | Hulbert | 248/100 |
| 2,007,518 | 7/1935 | Calhoun | 285/260 |
| 2,503,118 | 4/1950 | Mannix | 248/100 |
| 2,973,614 | 3/1961 | Horner et al. | 56/202 |
| 3,129,550 | 4/1964 | Waag | 56/202 |
| 3,133,396 | 5/1964 | Leader | 56/202 |
| 3,387,346 | 6/1968 | Hasenbeck | 56/202 |
| 3,441,655 | 4/1969 | Turner | 285/260 |
| 3,522,695 | 8/1970 | Musgrave | 56/16.6 |
| 3,618,157 | 11/1971 | Bassin | 56/202 |
| 3,791,118 | 2/1974 | Behrens | 56/202 |
| 3,805,500 | 4/1974 | Sweet | 56/202 |
| 3,874,154 | 4/1975 | Dahl | 56/202 |
| 3,903,565 | 9/1975 | Hicks | 56/16.6 |
| 3,995,414 | 12/1976 | Kerr et al. | 56/202 |
| 4,142,351 | 3/1979 | Neice et al. | 56/202 |
| 4,233,806 | 11/1980 | Richardson | 56/202 |

FOREIGN PATENT DOCUMENTS 200452  5/1983  Fed. Rep. of Germany ........ 56/202

Primary Examiner—Gene Mancene
Assistant Examiner—David I. Tarnoff
Attorney, Agent, or Firm—Donald A. Kettlestrings

[57] ABSTRACT

Bag attachment apparatus is provided for enabling a plastic or similar type of trash, leaf, or lawn clippings-receiving bag to be removably attached to a lawn mower or other apparatus whereby trash, leaves, lawn clippings or the like are easily introduced into the bag. The full plastic bag can then be quickly and easily removed from the bag attachment apparatus for disposal. Additional lawn mower attachment apparatus are provided for attachment to lawn mowers for supporting a leaf or lawn clippings-receiving bag, which bag may be attached to the lawn mower by means of the bag attachment. The lawn mower attachment apparatus elements can be assembled into a variety of multi-purpose devices.

29 Claims, 16 Drawing Figures

U.S. Patent  Jul. 8, 1986  Sheet 1 of 8  4,598,536
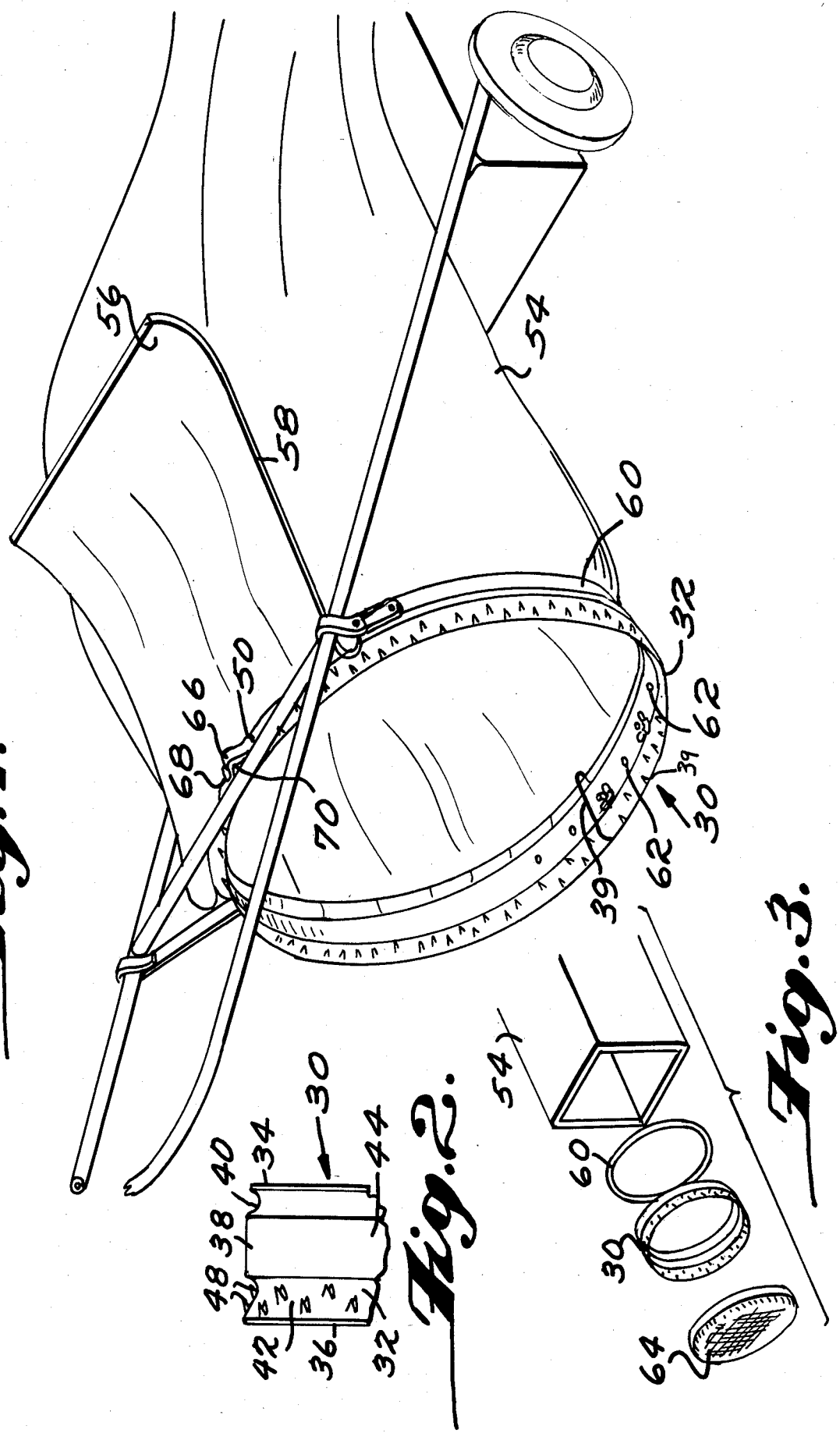

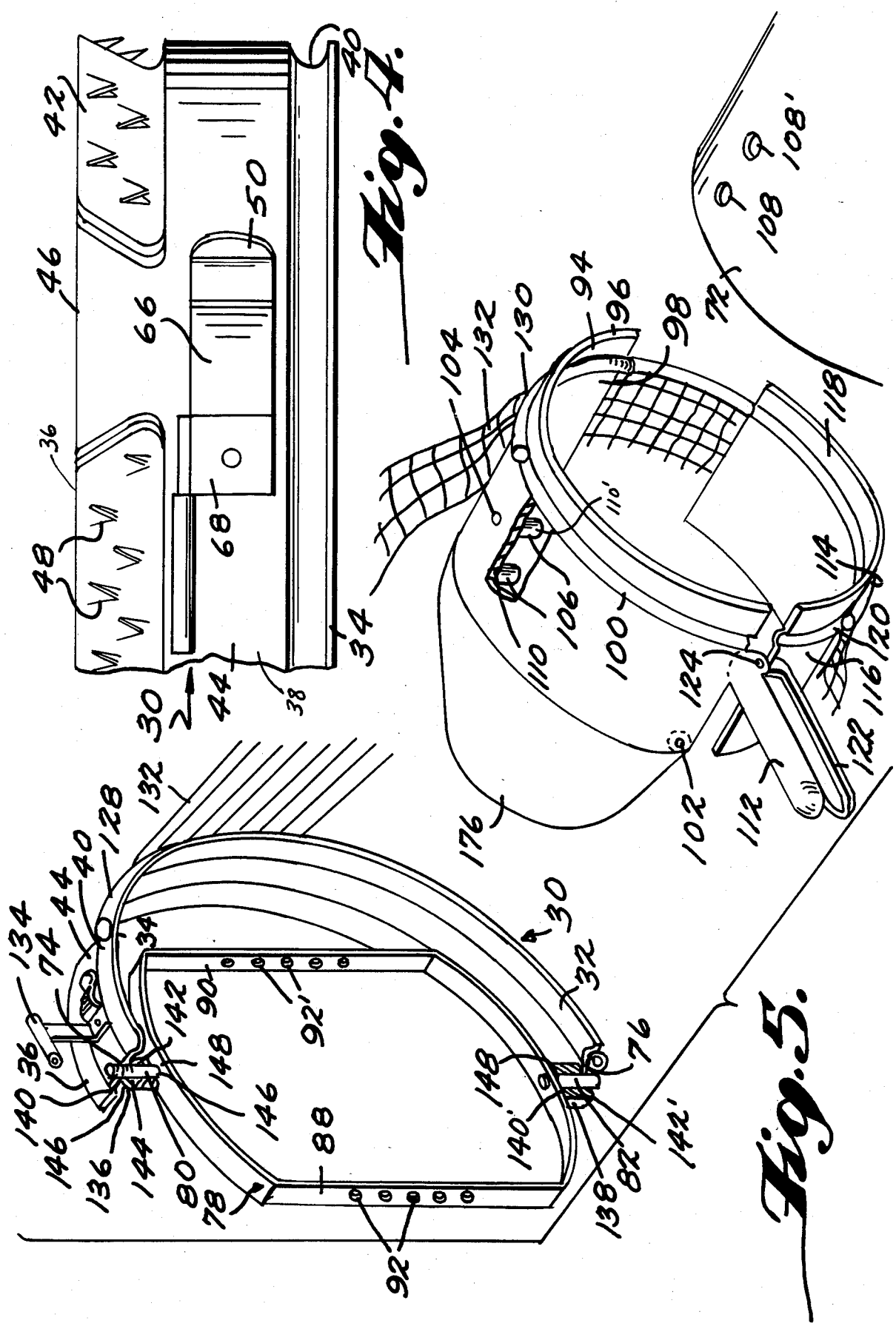

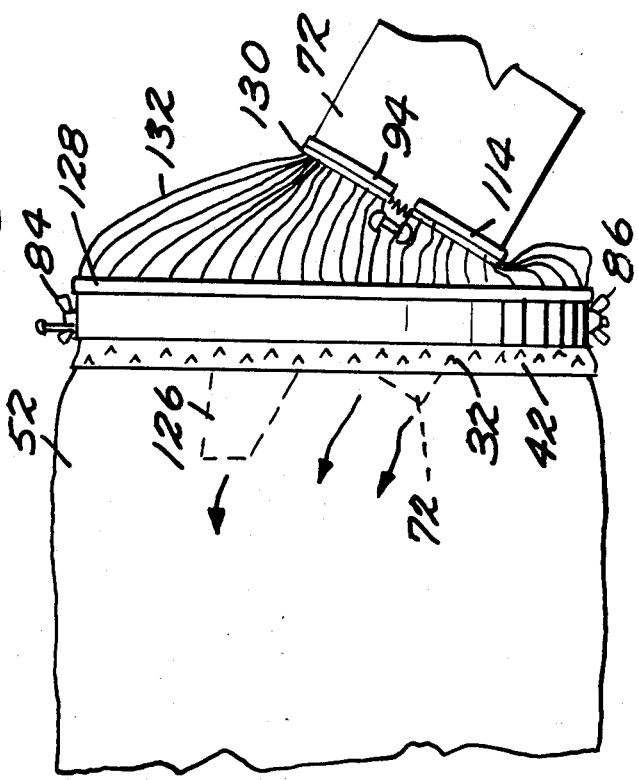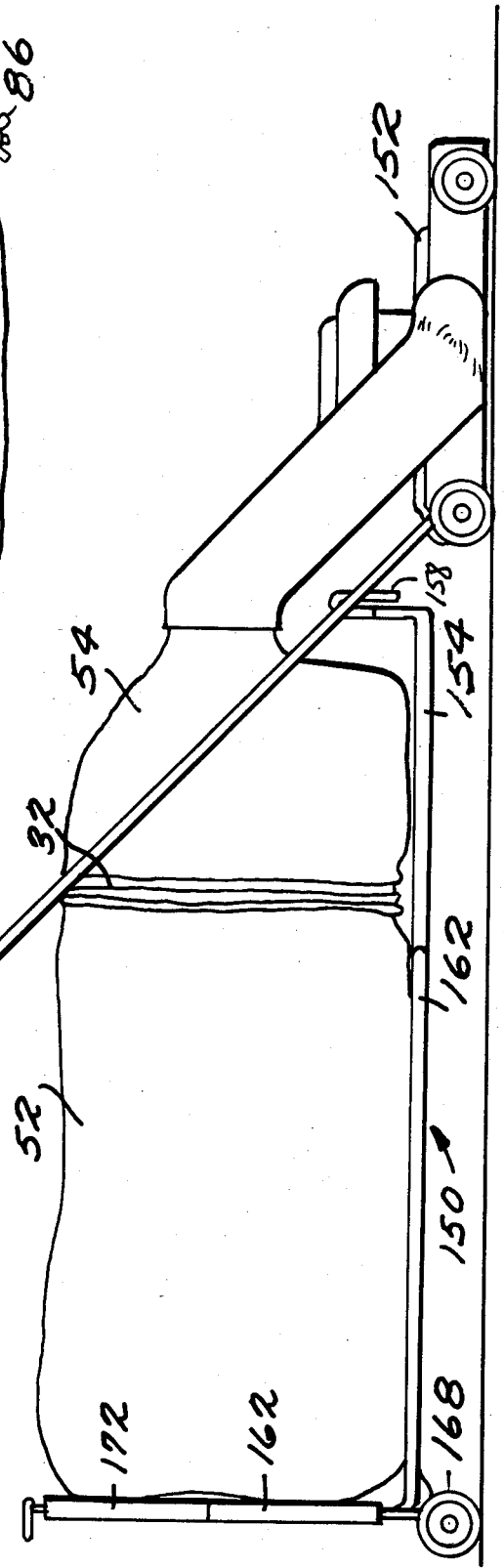

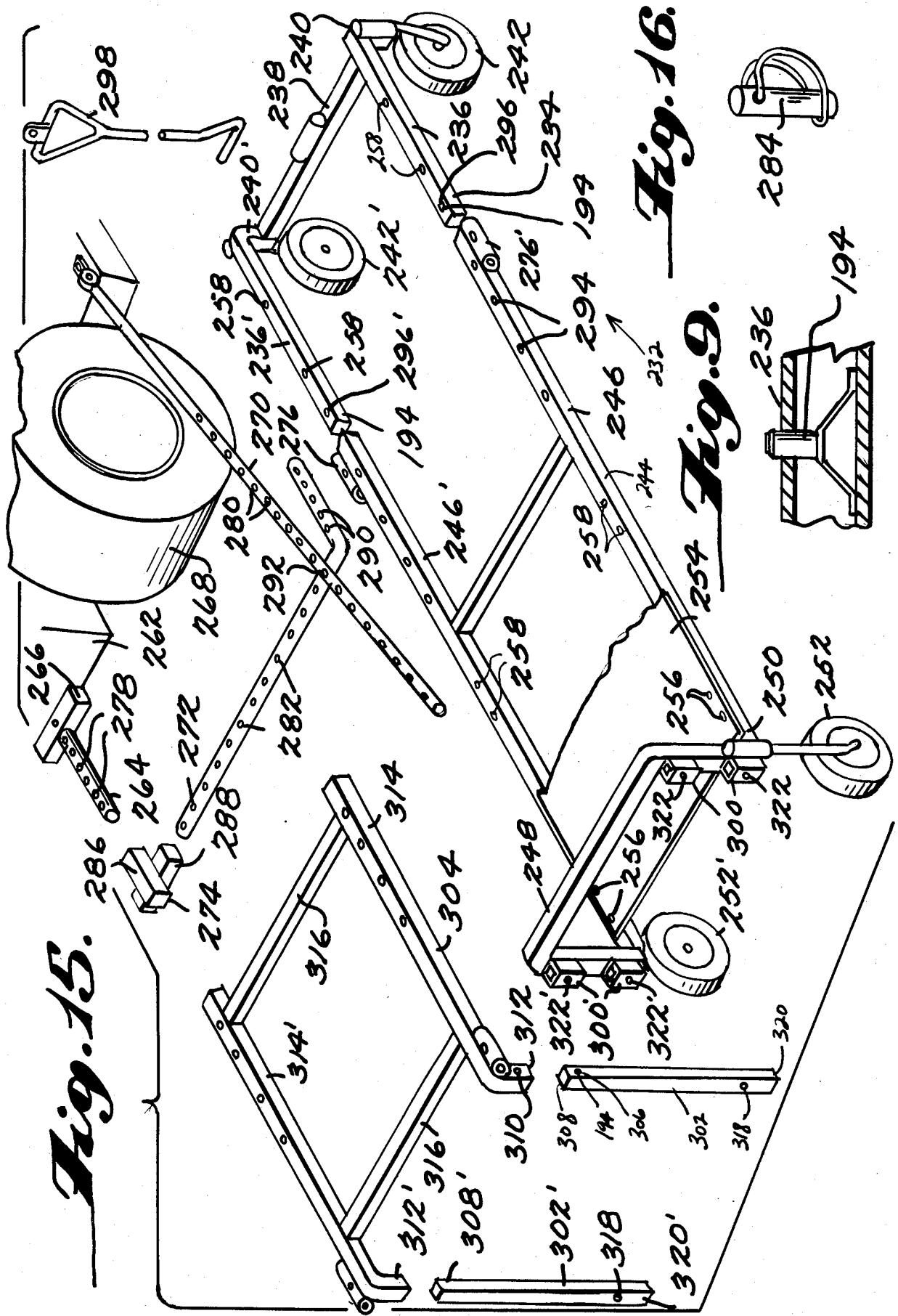

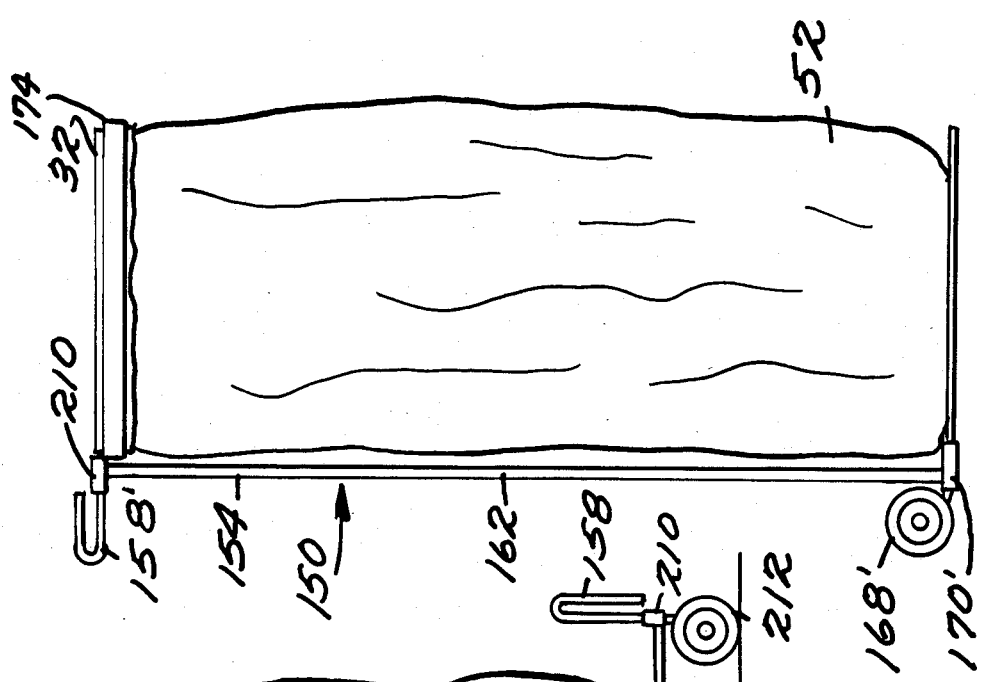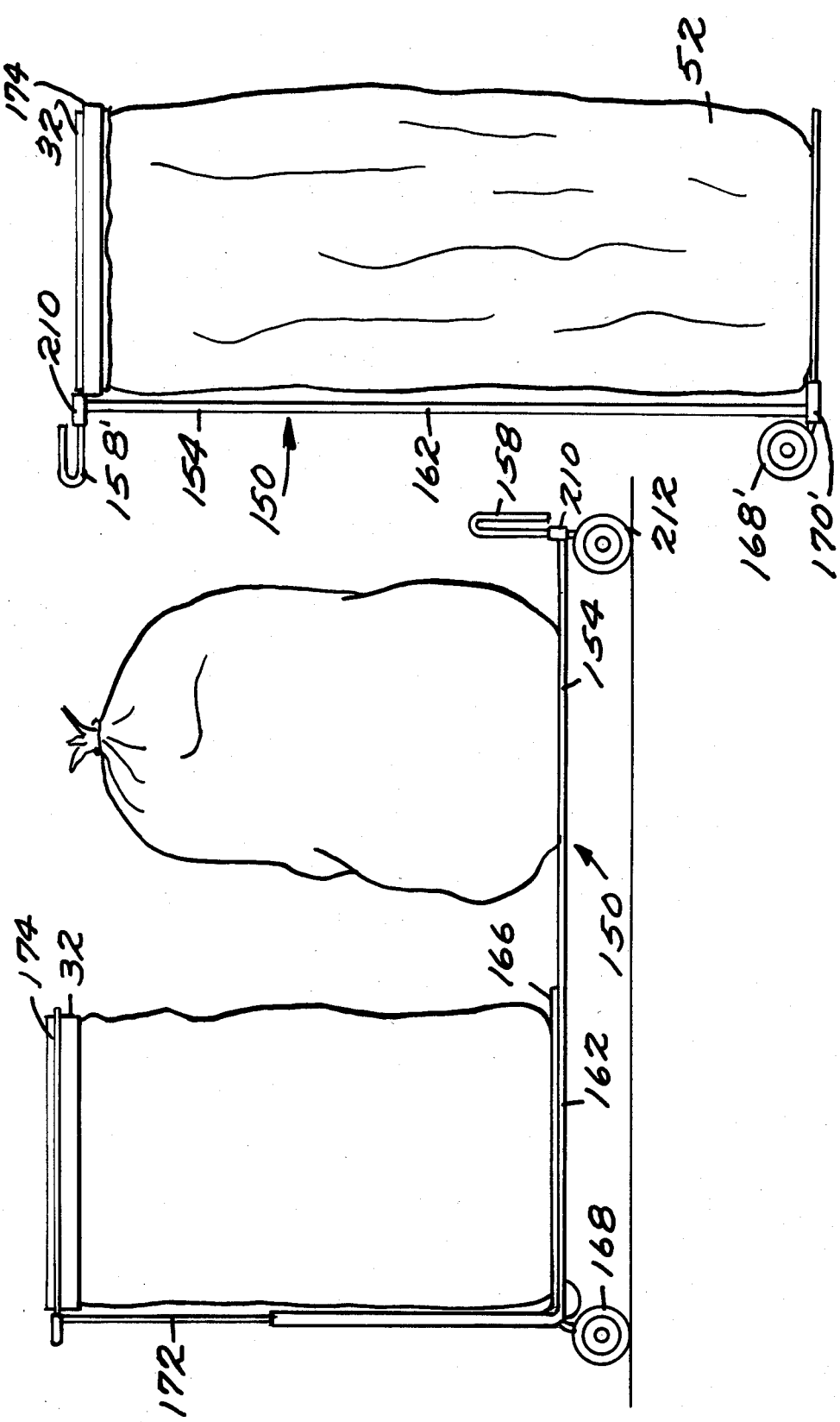

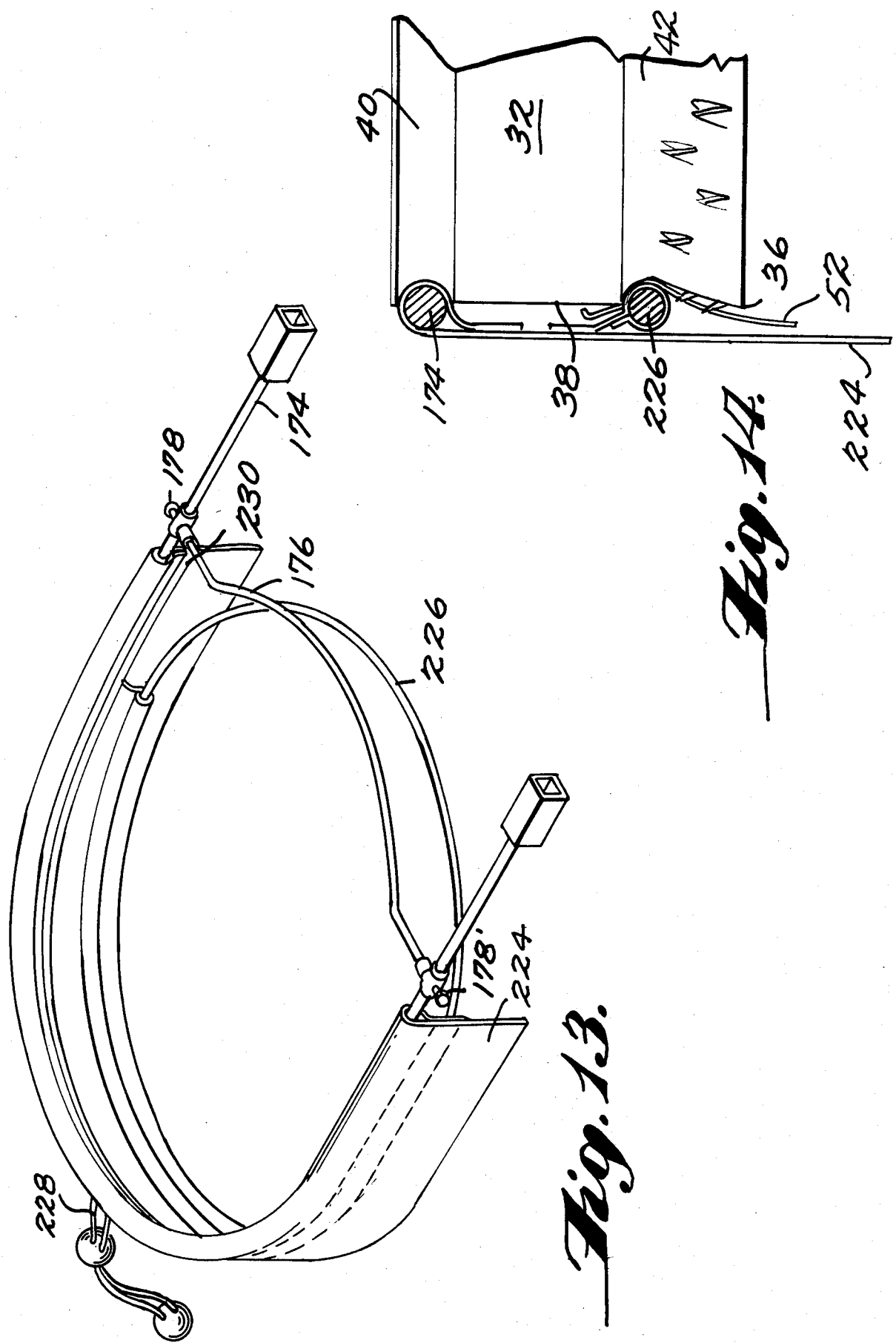

BAG ATTACHMENT AND LAWN MOWER APPARATUS

This invention relates to bag attachment and lawn mower apparatus and more particularly to apparatus for facilitating attachment of a plastic or similar type of leaf or lawn clippings-receiving bag to a lawn mower. The bag attachment apparatus may be used with other devices when it is desired to temporarily position a plastic or similar type of bag in convenient position for receiving trash, leaves, lawn clippings or the like.

When mowing a lawn or when gathering leaves with a lawn mower or other device, unloading of the lawn clippings or leaves from the mower bag into a disposable plastic bag is a time consuming inconvenience. It is also difficult to retain the mouth of a plastic disposable bag in an open position to easily receive the lawn clippings or leaves. It is frequently necessary to require one person to hold the plastic disposable bag in an open position while a second person empties the contents of the lawn mower bag into the plastic disposable bag.

It is, therefore, an object of the present invention to provide apparatus for use with a plastic or similar type of trash, leaf, or lawn clippings-receiving bag wherein the plastic bag can be quickly and easily attached to the apparatus in a convenient position for receiving trash, leaves, lawn clippings or the like.

Another object is to provide such an apparatus which is adapted to be attached to a lawn mower to permit a disposable plastic bag to be connected to the lawn mower to directly receive leaves or lawn clippings.

A further object of the invention is the provision of additional apparatus to be connected to the lawn mower for supporting a disposable plastic bag which is attached to the lawn mower by means of the bag attachment.

Still another object is to provide such additional apparatus which is comprised of elements which can be assembled into different configurations for multiple uses.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides apparatus for use with a plastic or similar type of trash, leaf or lawn clippings-receiving bag, the apparatus comprising: a ring member defining first and second edges and an outer circumferential surface extending between the edges; the circumferential surface defining a first annular concave surface contiguous with the first edge; the circumferential surface further defining a second substantially annular concave surface contiguous with the second edge; the circumferential surface further defining a third annular surface extending between the first and second concave surfaces and contiguous with a predetermined portion of the second edge; a plurality of bag-retaining members projecting from the second concave surface; and means attached to the third annular surface, adjacent to the predetermined portion of the second edge and cooperating with the bag-retaining members, for holding the bag in position on the apparatus.

In accordance with the invention, the ring member may be cut completely across the circumferential surface at one location and at substantially right angles with respect to the first and second edges, and the third annular surface defines a plurality of bolt-receiving openings positioned at predetermined locations for enabling the ring member to be adjusted in size to different predetermined diameters.

When the apparatus is adapted for attachment directly to the discharge chute of a lawn mower, the third annular surface defines first and second openings in diametrically opposed locations. The apparatus further includes a swivel member defining first and second pins, the pins rotatably positioned in the first and second openings; first and second fastening elements removably attached to the first and second pins and contacting the ring member to hold the ring member and the swivel member in adjustable fixed relationship with each other. The swivel member further includes first and second bracket members attached to the pins, each of the bracket members attached to the pins and each of the bracket members defining a plurality of spaced apart, bolt-receiving openings.

Preferably, this configuration of the apparatus includes a first arcuate member defining an outer circumferential surface and an opposed inner surface, the outer circumferential surface defining a first arcuate concave surface and the first arcuate member defining first and second bolt-receiving openings positioned to enable selective alignment with the bolt-receiving openings in the bracket members; means in operative relationship with the first arcuate member for attaching the first arcuate member to a grass exhaust pipe of a lawn mower; a first handle member projecting outwardly from the outer circumferential surface; a second arcuate member defining an outer circumferential surface and an opposed inner surface, the last-mentioned outer circumferential surface defining a second arcuate concave surface; a second handle member projecting outwardly from the last-mentioned outer circumferential surface; and means in operative relationship with the first and second handle members for pivotally connecting the handle members together.

It is to be understood that the foregoing general description and the following detailed description are exemplary and explanatory but are not restrictive of the invention.

The accompanying drawings, which are incorporated in and constitute a part of this specification, illustrate examples of preferred embodiments of the invention and, together with the description, serve to explain the principles of the invention.

FIG. 1 is a fragmentary perspective view of an embodiment of the invention showing ring apparatus attached to a lawn mower catcher bag;

FIG. 2 is a fragmentary end view of the ring;

FIG. 3 is an exploded perspective view showing the relationship of the ring to a lawn mower catcher bag having an end of the bag removed for receiving the ring;

FIG. 4 is a fragmentary top plan view of the ring showing a latch member on the ring;

FIG. 5 is a fragmentary exploded perspective view of another invention embodiment for use with riding lawn mowers;

FIG. 6 is a fragmentary side elevation view of the apparatus of FIG. 5 showing the apparatus attached to a grass exhaust duct of a riding lawn mower;

FIG. 7 is a side elevation view of another invention embodiment;

FIG. 9 is a side sectional view of a conventional fastening element used with this invention;

FIG. 10 is a side elevation view of the invention embodiment shown in FIG. 8 but showing it when used as a cart;

FIG. 11 is a side elevation view of the invention embodiment shown in FIG. 8 but showing it when used as a leaf bagging cart;

FIG. 13 is a perspective view of an alternative claw ring embodiment;

FIG. 14 is a fragmentary elevational view of the embodiment of FIG. 13 with parts shown in section;

FIG. 15 is an exploded perspective view of an alternative invention embodiment; and FIG. 16 is a perspective view of a conventional fastener used in the invention.

Figure 8:
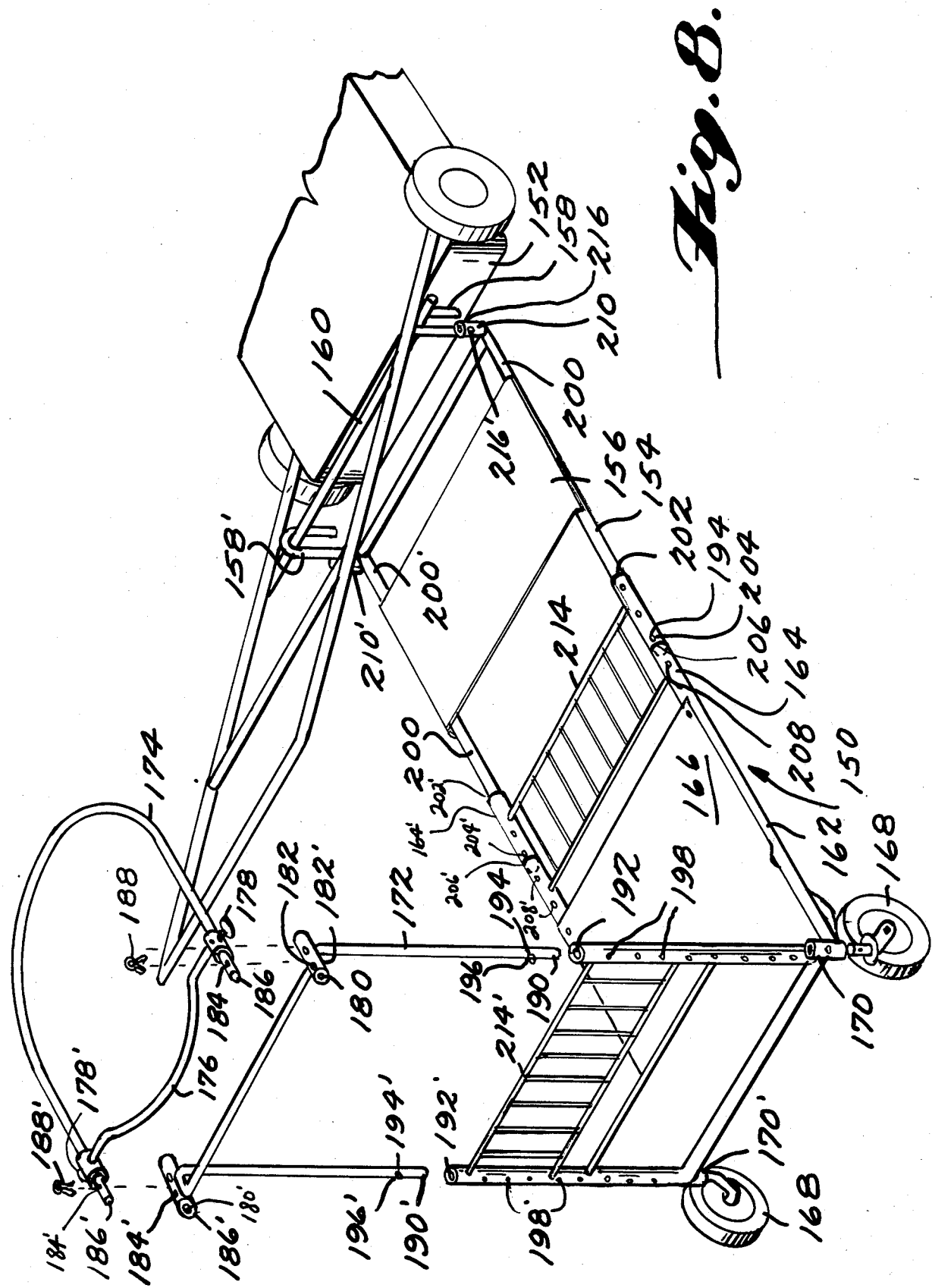
FIG. 8 is a fragmentary partially exploded perspective view of the invention embodiment shown in FIG. 7.

With reference now to the drawings, wherein like reference characters designate like or corresponding parts throughout the several views, there is shown in FIGS. 1–4 apparatus 30 for use with a plastic or similar type of trash, leaf or lawn clippings-receiving bag. Apparatus 30 includes a ring member 32 defining first and second edges 34, 36 and an outer circumferential surface 38 extending between edges 34 and 36.

Circumferential surface 38 defines a first annular concave surface 40 contiguous with first edge 34 and a second annular concave surface 42 contiguous with second edge 36. Circumferential surface 38 also defines a third annular surface 44 extending between first concave surface 40 and second concave surface 42 and contiguous with a predetermined portion 46 of second edge 36.

A plurality of pointed bag-retaining members 48 project from second concave surface 42, and bag holding means 50 are attached to third annular surface 44 and adjacent to predetermined portion 46 of edge 36. Means 50 cooperate with bag-retaining members 48 to hold a plastic or similar type of trash, leaf, or lawn clippings-receiving bag 52 in position on apparatus 30.

Apparatus 30 may be used for attachment to a lawn mower grass catcher bag or the like. As illustrated in FIG. 1, lawn mower catcher bag 54 can be provided with a flap 56, and a zipper or other conventional fastening means 58 enables flap 56 to be opened to expose the interior of catcher bag 54. Apparatus 30 is then inserted into the open end of catcher bag 54, and a first elastic band 60 is positioned within concave surface 40 and with a portion of catcher bag 54 positioned between elastic band 60 and concave surface 40 to hold apparatus 30 in position with respect to catcher bag 54.

As illustrated in the embodiment of FIG. 1, ring member 32 is cut completely across circumferential surface 38 at 39 and at substantially right angles with respect to edges 34, 36. In this embodiment, annular surface 44 defines a plurality of bolt-receiving openings 62 positioned at predetermined locations for enabling ring member 32 to be adjusted in size to different predetermined diameters. This will enable apparatus 30 to be used with catcher bags 54 of different sizes.

When the lawn mower with apparatus 30 attached to catcher bag 54, as illustrated in FIG. 1, is not in use it will be desirable to cover apparatus 30 so as to enclose catcher bag 54. Accordingly, an elasticized cover member 64 (FIG. 3) is provided for placement onto concave surface 42 or onto surface 44 when plastic bag 52 is not attached to apparatus 30.

In accordance with the invention, the bag-retaining members 48 preferably include a plurality of sharp pointed elements having the points directed substantially toward first edge 34. Holding means 50 include a latch member 66 attached at one end 68 thereof to surface 44 and defining a channelled central portion 70 for receiving and retaining a bunched portion of plastic bag 52.

Apparatus 30 can be adapted for direct attachment to an exhaust duct 72, for example, of a conventional riding lawn mower. This preferred embodiment of the invention is illustrated in FIGS. 5–6 wherein annular surface 44 defines first and second openings 74, 76 in diametrically opposed locations. The apparatus of this embodiment further includes a swivel member 78 defining first and second pins 80, 82, and the pins are rotatably positioned within openings 74, 76. First and second fastening elements 84, 86 are removably attached to first and second pins 80, 82, and fastening elements 84, 86 contact ring member 32 to hold the ring member and swivel member 78 in adjustable fixed relationship with each other. Swivel member 78 further includes first and second bracket members 88, 90 attached to pins 80, 82, each of the bracket members defining a plurality of spaced apart bolt-receiving openings 92, 92'.

As further shown in FIGS. 5–6, a first arcuate member 94 defining an outer circumferential surface 96 and an opposed inner surface 98 is provided. Outer surface 96 defines a first arcuate concave surface 100, and arcuate member 94 defines first and second bolt-receiving openings 102, 104 positioned to enable selective alignment with bolt-receiving openings 92, 92', respectively, in bracket members 88, 90.

Means 106 are provided in operative relationship with arcuate member 94 for attaching member 94 to exhaust pipe 72 of a riding lawnmower. As illustrated, holes 108, 108' may be provided in exhaust 72, and attaching means 106 may include pins 110, 110' projecting from inner surface 98 of member 94. Pins 110, 110' are of a size and shape and are spaced to fit within holes 108, 108'. The diameter of inner surface 98 is made at least as large as the largest diameter of an exhaust pipe 72. First handle member 112 projects outwardly from outer circumferential surface 96.

A second arcuate member 114 is also provided, and member 114 defines an outer circumferential surface 116 and an opposed inner surface 118. Outer surface 116 defines a second arcuate concave surface 120, and a second handle member 122 projects outwardly from outer surface 116. Means 124, such as a pin, are provided in operative relationship with handle members 112, 122 for pivotally connecting the handle members together.

In accordance with a preferred embodiment of the invention, a grass or leaf deflecting member 126 is integral with and projects rearwardly from first arcuate member 94.

An elastic band 128, a second elastic band 130 and a flexible cover of fabric or similar material 132 are provided. Elastic band 128 is positioned in first annular concave surface 40 with one end of cover 132 held in position between elastic band 128 and annular concave surface 40. Second elastic band 130 is positioned in first and second arcuate concave surfaces 100, 120 with a second end of cover 132 held in position between elastic band 130 and concave surfaces 100, 120.

A third handle member 134 is fastened to and projects from annular surface 44. First and second washers 136, 138 are positioned on pins 80, 82 and between bracket members 88, 90 and ring member 32. Each of washers 136, 138 defines an upper surface 140, 140' and a lower surface 142, 142', respectively, and a plurality of lands 144 and grooves 146 are defined within each of surfaces 140, 140', 142, 142'. Bracket members 88, 90 and ring member 32 also define a plurality of complementary lands 146 and grooves 148 for interlocking with the lands and grooves of washers 136, 138. This assists in maintaining brackets 88, 90 in fixed relative positions with respect to ring member 32 when fastening elements 84, 86 are tightened into position on pins 80, 82.

With reference now to FIGS. 7–8, there is shown a preferred embodiment of a lawn mower attachment apparatus 150 adapted for selective attachment to a push lawn mower 152 and convertible to different configurations for use in combination with apparatus 30. Lawn mower attachment apparatus 150 includes a first assembly 154 defining at least one substantially flat surface 156 for supporting a plastic or similar type of leaf or lawn clippings-receiving bag 52. Assembly 154 includes hook members 158, 158' for removably attaching assembly 154 to a rear portion 160 of lawn mower 152.

Apparatus 150 further includes a second assembly 162 removably and adjustably attachable to first assembly 154. Assembly 162 includes two substantially L-shaped hollow tubular members 164, 164' connectable to first assembly 154. A supporting surface 166 extends between L-shaped members 164, 164', and first and second wheels 168, 168' are removably mounted on assembly 162 by means of first and second wheel assembly retaining means 170, 170', which are mounted at the vertices of L-shaped members 164, 164'.

A first substantially U-shaped member 172 is removably and adjustably attachable to assembly 162, and a second substantially U-shaped member 174 is removably attachable to member 172. A bar 176 is adjustably attached to U-shaped member 174 by conventional fastening means 178, 178'. Bar 176 and U-shaped member 174 cooperate to selectively grasp and hold ring member 32 by engaging annular, concave surface 40 of the ring member. Bar 176 is slidably positioned with respect to U-shaped member 174, and fastening elements 178, 178' are tightened to enable bar 176 and member 174 to firmly engage concave surface 40 of ring member 32 (not shown in FIGS. 7–8). This configuration is illustrated in FIG. 8, and plastic bag 52 can be attached to ring member 32 to enable the bag to be filled with leaves or grass clippings.

First U-shaped member 172 includes first and second tubular receiving members 180, 180', each defining two openings, 182, 182' in the walls thereof diametrically opposed to each other. Second U-shaped member 174 defines openings 184, 184' adjacent each free end 186, 186' thereof, and pin elements 188, 188' are removably inserted through respective ones of openings 184, 184' for removably attaching U-shaped members 172, 174 together.

L-shaped members 164, 164' are hollow tubes, and free ends 190, 190' of U-shaped member 172 are of a size and shape to fit within free ends 192, 192' of L-shaped members 164, 164'. A conventional spring-loaded fastening element 194, illustrated in FIG. 9, is positioned within U-shaped member 172 and adjacent to each free end 190, 190' thereof. Each fastening element 194 normally projects through an aperture 196, 196' of member 172. Each of L-shaped members 164, 164' defines a first plurality of spaced apart openings 198, 198' for receiving fastening elements 194 when free ends 190, 190' of member 172 are slidably inserted into free ends 192, 192' of L-shaped members 164, 164'. Because each of L-shaped members 164, 164' is provided with a plurality of spaced apart openings 198, 198', the relative positions of U-shaped member 172, and second assembly 162 can be adjusted.

In accordance with the invention, first assembly 154 includes two substantially parallel, hollow, tubular members, 200, 200' of a size and shape to fit within free ends 202, 202' of L-shaped members 164, 164'. Each of parallel members 200, 200' is provided with a conventional spring-loaded fastening element 194 which is positioned within tubular members 200, 200' and which normally projects through openings 204, 204' adjacent free ends 206, 206' of tubular members 200, 200'. Each of L-shaped members 164, 164' defines a second plurality of spaced apart openings 208, 208' for receiving fastening elements 194 whereby the relative positions of assemblies 154 and 162 can be adjusted.

Preferably, third and fourth wheel retaining means 210, 210' are attached to first assembly 154 and adjacent hook members 158, 158' for removably receiving additional wheels 212, 212', as illustrated in FIG. 8.

Apparatus 150 when attached to push lawn mower 152 for the purpose of supporting a leaf or lawn clippings-receiving bag 52 is assembled with only first and second assemblies 154, 162. Plastic bag 52 is attached to the lawn mower or to the lawn mower catcher bag by ring member 32, and plastic bag 52 is supported by flat surface 156 and supporting surface 166. Additional supporting elements 214, 214' may also be provided for supporting and containing plastic bag 52.

Apparatus 150 can also be assembled into different configurations for different uses. As illustrated in FIG. 10, apparatus 150 can be assembled to act as a garbage or general purpose cart. In the configuration of FIG. 10, first assembly 154 is unattached from lawn mower 152, and second assembly 162 is attached to first assembly 154 in the manner previously described. Wheels 168, 168' are attached to second assembly 162, and U-shaped member 172 is attached to second assembly 162 in a manner as previously described. If the cart to be assembled is also to be used as a leaf or lawn-clippings bagger, second U-shaped member 174 is attached to first U-shaped member 172 in a manner as previously described. Ring member 32 is then attached to U-shaped member 174 and to bar 176 as previously described. Additional wheels 212, 212' are attached to wheel retaining means 210, 210' to form a garbage, leaf-bagging or general purpose cart.

Apparatus 150 is assembled to form a leaf-bagging cart, as illustrated in FIG. 7. First assembly 154 is attached to lawn mower 152 by means of hook members 158, 158', as previously described. A second assembly 162 is attached to first assembly 154, as previously described, and wheels 168, 168' are removably attached to assembly 162. Ring member 32 is attached to lawn mower 152 or to lawn mower catcher bag 54, as previously described, to form a leaf or a lawn clippings cart to be drawn behind lawn mower 152. If greater containment of plastic bag 52 is desired, first U-shaped member 172 is attached to second assembly 162, as previously described, to provide a higher abutment against which plastic bag 52 can rest.

Apparatus 150, used as a leaf or lawn-clippings bagger, is illustrated in FIG. 11 wherein first assembly 154 is attached to second assembly 162 in a manner as previously described. Ring member 32 is attached to first assembly 154 by inserting fee ends 186, 186' of U-shaped member 174 into wheel retaining members 210, 210'. Each of wheel retaining members 210, 210' defines openings 216, 216' which are aligned with openings 184, 184' of U-shaped member 174, and pin elements 188, 188' are inserted through openings 184, 184', 216, 216' to hold U-shaped member 174 in fixed position with respect to wheel retaining means 210, 210'.

First U-shaped member 172 is attached to second assembly 162, as previously described, and wheels 168, 168' are attached to assembly 162 to form a bagging assembly or cart for suspending plastic bag 52 from ring member 32 to facilitate filling of bag 52 with leaves or grass clippings.

Figure 12:
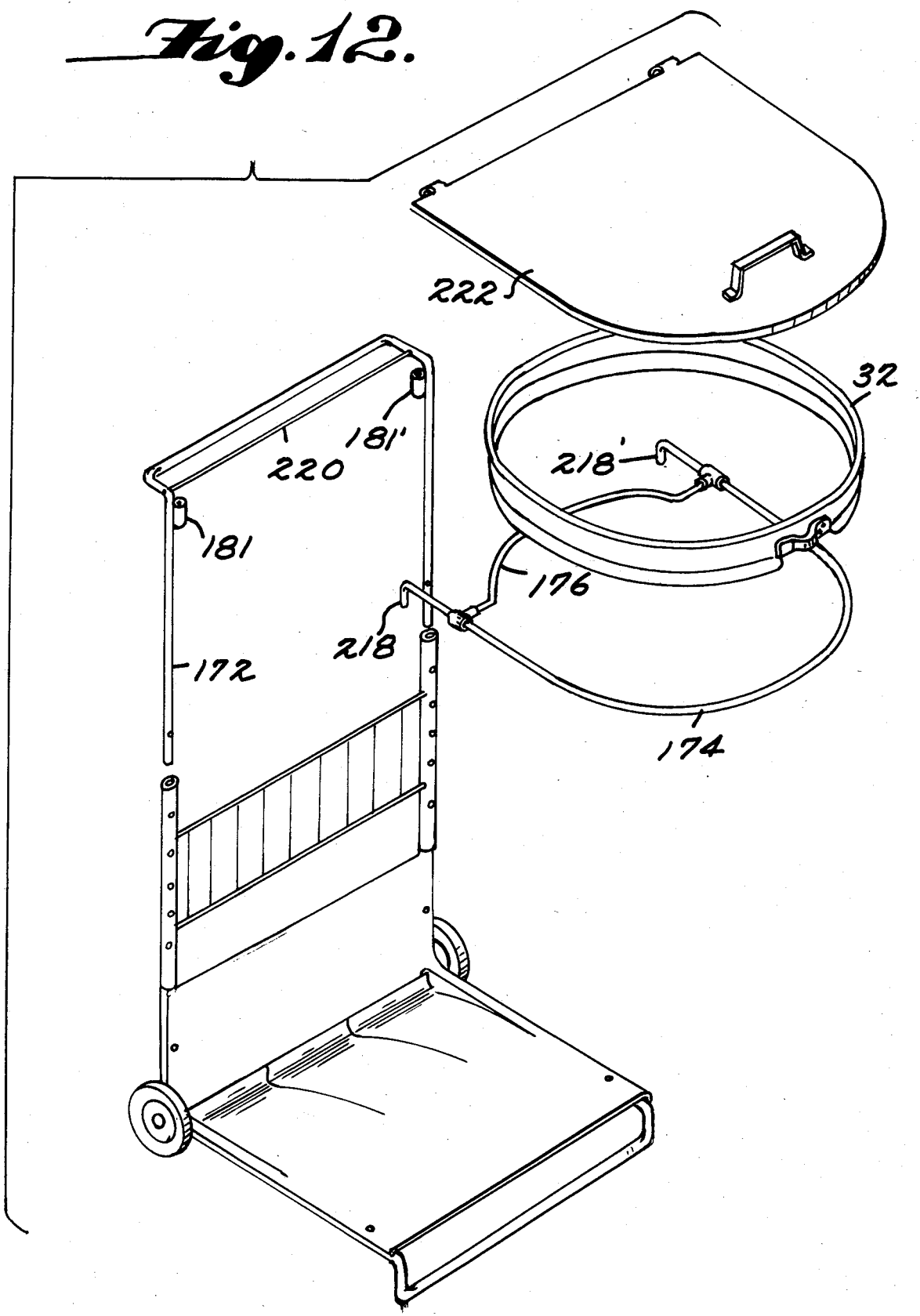
FIG. 12 is an exploded perspective view of an alternative embodiment of the invention.

An alternative structural arrangement is illustrated in FIG. 12 wherein U-shaped member 172 includes tubular receiving members 181, 181' of a size and shape to internally receive free ends 218, 218' of U-shaped member 174. This alternative embodiment further includes a rod 220 attached to U-shaped member 172, and a lid 222 rotatably mounted on rod 220 and positioned for enabling the lid to selectively contact ring member 32 and to close off an open end of plastic bag 52 (not shown) which is attached to ring member 32.

Another embodiment of the invention is illustrated in FIGS. 13–14 wherein U-shaped member 174 is adjustably attached to bar 176 as previously described. Bar 176 and member 174 cooperate to selectively grasp and hold ring member 32 by engaging annular concave surface 40 of ring member 32, as previously described. This embodiment further includes a protective cover 224 attached to a predetermined portion of U-shaped member 174, the cover being of a size and shape to extend adjacent to outer circumferential surface 38 and below second edge 36 when ring member 32 is attached to U-shaped member 174 and is grasped by bar 176. A substantially circular elastic band 226 is attached to protective cover 224, and band 226 is of a size to enable the band to tightly encircle and grasp second annular, concave surface 42 whereby plastic bag 52 can be positioned and held between band 226 and annular, concave surface 42.

An alternative embodiment may include a draw-string 228 in place of elastic band 226. The draw-string is attached to protective cover 224, and the draw-string is of a size and is adjustable to enable the draw-string to tightly encircle and grasp annular, concave surface 42, whereby plastic bag 52 can be positioned and held between the draw-string and surface 42.

It may also be preferable to provide means 230 in operative relationship with protective cover 224 for selectively enabling the removal of the cover from U-shaped member 174. Removal means 230 may take the form of a zipper or any other conventional fastening element or elements.

An embodiment 232 of this invention for attachment to a riding power lawn mower and for supporting a plastic bag 52, which bag is attachable to the riding lawn mower, is illustrated in FIG. 15. Apparatus 232 includes a first substantially U-shaped assembly 234 defining first and second substantially parallel, hollow, tubular members 236, 236' and a first cross member 238 connecting first ends 240, 240' of members 236, 236' together. First and second wheels 242, 242' are removably attached to assembly 234 and adjacent to ends 240, 240'. A second assembly 244 is provided and defines third and fourth substantially parallel hollow tubular members 246, 246'. A second substantially U-shaped cross member 248 connects first ends 250, 250' of members 246, 246' together. Third and fourth wheels 252, 252' are removably attached to second assembly 244 and adjacent to ends 250, 250'. Means 194 are provided in operative relationship with assemblies 234, 244 for removably and adjustably connecting the assemblies together. Connecting means 194 is preferably a conventional spring-loaded fastening element, as illustrated in FIG. 9.

Means 254 are positioned in operative relationship with assemblies 234, 244 for supporting plastic bag 52, and supporting means 254 is removably and adjustably connected to assemblies 234, 244. Supporting means 254 is preferably a thin, flat piece of plastic or metal having a plurality of spaced apart fastener receiving openings 256 along the edges thereof. An additional plurality of fastener receiving openings 258 are provided within tubular members 236, 236', 246, 246', and openings 256 are spaced apart from each other a distance equal to the spacings between openings 258.

Means 260 are provided in operative relationship with second assembly 244 for removably attaching assembly 244 to riding lawn mower 262. Attaching means 260 include a fifth tubular member 264 attachable to the rear 266 of lawn mower 262 and substantially midway between rear wheels 268 of the lawn mower. A sixth tubular member 270 is removably and movably attachable to a side of the lawn mower, and a substantially L-shaped tubular member 272 is removably and movably attached to tubular member 270.

A right angle joint member 274 is removably and movably attached to tubular member 264 and to L-shaped member 272, and means 276, 276' are provided in operative relationship with assembly 244 for removably and movably holding L-shaped member 272 whereby relative movements between lawn mower 262 and attachment apparatus 232 are permitted.

Each of tubular members 264, 270, and 272 defines a plurality of spaced apart openings 278, 280 and 282, respectively. Conventional pin elements 284, as illustrated in FIG. 16, are used to enable members 264, 274, 272, and 270 to be movably and removably connected together. Pin elements 284 are also used with member 272 to enable member 272 to be movably and removably connected to holding means 276 or 276'. For example, first and second pin members or pin elements 284 can be removably positioned within and project outwardly from predetermined ones of openings 278 in tubular member 264. These pin elements are positioned on opposite sides of a first predetermined portion 286 of joint member 274 to retain the joint member in movable position on member 264.

Similarly, additional pin elements 284 can be removably positioned within and project outwardly from predetermined ones of openings 282 in tubular member 272. The pin elements are positioned on opposite sides of the second predetermined portion 288 of joint member 274 to retain the joint member in movable position on tubular member 272.

Additional pin elements 284 can be removably positioned within to project outwardly from additional predetermined ones of openings 290 in tubular member 272, and these pin elements are positioned on opposite sides of holding means 276 to retain member 272 in movable position within holding means 276. In this preferred embodiment, holding means 276, 276' are short sections of hollow tubes which are welded or otherwise conventionally attached to the sides of tubular members 246, 246'. The interior diameters of tubular sections 276, 276' are slightly larger than the external diameter of L-shaped member 272 so that an end portion of tubular member 272 can slidably fit into hollow tubular sections 276 or 276'.

In accordance with the invention, a fastener 292 is attached to L-shaped member 272 and normally movably grasps tubular member 270. Fastener 292 may be a ring-shaped element having an internal diameter slightly larger than the external diameter of tubular member 270. Pin members or elements 284 can be removably positioned within to project outwardly from predetermined ones of openings 280 in tubular member 270, and pin elements 284 are positioned on opposite sides of fasteners 292 to retain the fastener in movable position on tubular member 270.

Tubular members 246, 246' each defines a plurality of spaced apart openings 294, 294', and tubular members 236, 236' each defines at least one opening 296, 296'. A spring-loaded fastening element 194 is normally positioned within and projects through each of openings 296, 296', and tubular members 236, 236' are of a size and shape to slidably fit within hollow tubular members 246, 246', respectively. The combined length of assemblies 234 and 244 can be adjusted by moving tubular members 236, 236' to varying distances within members 246, 246'. When the desired combined length is attained, spring-loaded fastening elements 194 project through openings 294, 294' to hold members 236 and 246 in fixed relationship with each other and to hold members 236' and 246' in fixed relationship with each other.

Attachment apparatus 232 may include additional structural elements to permit the apparatus to be adapted for different uses. For example, a handle 298 can be movably and removably attached to assembly 234 so that apparatus 232 may be used as a pull cart when it is not attached to a lawn mower.

First and second hollow, tubular holding members 300, 300' are attached to U-shaped cross member 248, and first and second straight tubular members 302, 302' are provided, each straight member being of a size and shape to be positioned within and held by respective ones of holding members 300, 300'. A third assembly 304 may also be provided which is removably attachable to tubular members 302, 302'. Each of tubular members 302, 302' is provided with an opening 306, 306' adjacent first ends 308, 308' thereof, and third assembly 304 defines openings 310, 310' adjacent first ends 312, 312' thereof. Spring-loaded fastening elements 194 are positioned within members 302, 302' and project through openings 306, 306'. Free ends 308, 308' are of a size and shape to slidably fit within free ends 312, 312' and spring-loaded fastening elements 194 move into position within openings 310, 310' to hold assembly 304 in fixed position with respect to tubular members 302, 302'.

Assembly 304 may be used together with tubular members 302, 302' to convert apparatus 232 into devices for various uses. Assembly 304 includes first and second substantially L-shaped members 314, 314' removably attachable to tubular members 302, 302' as previously described. Straight, cross members 316, 316' are connected between L-shaped members 314, 314', and the L-shaped members are positioned in substantially parallel relationship to each other.

Tubular members 302, 302' are provided with openings 318, 318' adjacent to second ends 320, 320' thereof. Spring-loaded fastening elements 194 are positioned within each of tubular members 302, 302' to extend through and project from openings 318, 318'. Each of holding members 300, 300' is provided with an opening 322, 322', and the size of holding members 300, 300' are such as to slidably receive therein free ends 320, 320' of tubular members 302, 302'. Spring-loaded fastening elements 194 are locked into openings 322, 322' to fixedly position tubular members 302, 302' within holding members 300, 300'.

If apparatus 232 is not attached to lawn mower 262, if wheels 242, 242' are removed from assembly 234, if assemblies 234 and 244 are connected together, and if assembly 304 is connected to the assembly 244 by means of tubular members 302, 302', apparatus 232 can be used as a two-wheeled dolly or cart.

It should also be understood that apparatus 232, when used as a lawn mower attachment, can be attached to either side of riding lawn mower 262, and attaching means 260 are designed to enable apparatus 232 to be attached to either side of the riding lawn mower.

The invention in its broader aspects is not limited to the specific details shown and described, and departures may be made from such details without departing from the principles of the invention and without sacrificing its chief advantages.

What is claimed is:

1. Apparatus for use with a plastic or similar type of trash, leaf or lawn clippings-receiving bag, said apparatus comprising:
   a ring member defining first and second edges and an outer circumferential surface extending between said edges;
   said circumferential surface defining a first annular, concave surface contiguous with said first edge for receiving an elastic band;
   said circumferential surface further defining a second annular concave surface contiguous with said second edge;
   said circumferential surface further defining a third annular surface extending between said first and second concave surfaces and contiguous with a predetermined portion of said second edge;
   a plurality of bag-retaining members projecting from said second concave surface: and
   means attached to said third annular surface adjacent to said predetermined portion of said second edge and cooperating with said bag-retaining members, for holding said bag in position on said apparatus.

2. Apparatus as in claim 1 and further including a first elastic band for holding a lawn mower grass catcher bag in position against said first concave surface.

3. Apparatus as in claim 2 wherein said ring member is cut completely across said circumferential surface and at substantially right angles with respect to said first and second edges, and said third annular surface defines a plurality of bolt-receiving openings positioned at predetermined locations for enabling said ring member to be adjusted in size to different predetermined diameters.

4. Apparatus as in claim 3 further including an elasticized cover member for placement onto said second annular surface or onto said third annular surface when a plastic or similar type of leaf or lawn clippings-receiving bag is not attached to said apparatus.

5. Apparatus as in claim 4 wherein said bag-retaining members include a plurality of pointed elements having the points directed substantially toward said first edge.

6. Apparatus as in claim 5 wherein said holding means include a latch member attached at one end thereof to said third annular surface and defining a channelled central portion for receiving and retaining a portion of said plastic or similar type of leaf or lawn clippings-receiving bag.

7. Apparatus as in claim 1 wherein said third annular surface defines first and second openings in diametrically opposed locations, and wherein said apparatus further includes:

a swivel member defining first and second pins, said pins rotatably positioned in said first and second openings;

first and second fastening elements removably attached to said first and second pins and contacting said ring member to hold said ring member and said swivel member in adjustable fixed relationship with each other;

said swivel member further including first and second bracket members attached to said pins, each of said bracket members defining a plurality of spaced apart, bolt-receiving openings.

8. Apparatus as in claim 7 further including:

a first arcuate member defining an outer circumferential surface and an opposed inner surface, said outer circumferential surface defining a first arcuate concave surface and said first arcuate member defining first and second bolt-receiving openings positioned to enable selective alignment with said bolt-receiving openings in said bracket members;

means in operative relationship with said first arcuate member for attaching said first arcuate member to a grass exhaust pipe of a lawn mower;

a first handle member projecting outwardly from said outer circumferential surface;

a second arcuate member defining an outer circumferential surface and an opposed inner surface, said last-mentioned outer circumferential surface defining a second arcuate concave surface;

a second handle member projecting outwardly from said last-mentioned outer circumferential surface; and means in operative relationship with said first and second handle members for pivotally connecting said handle members together.

9. Apparatus as in claim 8 further including a grass or leaf deflecting member projecting rearwardly from said first arcuate member.

10. Apparatus as in claim 8 further including a first elastic band, a second elastic band and a flexible cover, said first elastic band positioned in said first annular concave surface with one end of said cover held in position between said first elastic band and said first annular concave surface, said second elastic band positioned in said first and second arcuate concave surfaces with a second end of said cover held in position between said second elastic band and said first and second arcuate concave surfaces.

11. Apparatus as in claim 10 further including a third handle member fastened to and projecting from said third annular surface.

12. Apparatus as in claim 11 further including first and second washers positioned on said first and second pins and between said bracket members and said ring member, each of said washers defining upper and lower surfaces and a plurality of lands and grooves defined within each of said upper and lower surfaces, said bracket members and said ring member defining a plurality of lands and grooves for interlocking with the lands and grooves of said washers.

13. Apparatus for selective attachment to a push lawn mower, and convertible to different configurations, for use in combination with the apparatus of claim 1, said attachment apparatus, comprising:

a first assembly defining at least one substantially flat surface for supporting a plastic or similar type of leaf or lawn clippings-receiving bag, and including means for removably attaching said first assembly to a rear portion of said lawn mower;

first and second wheels;

a second assembly removably and adjustably attachable to said first assembly, said second assembly including two substantially L-shaped members connectible to said first assembly, a supporting surface extending between said L-shaped members, and first and second wheel retaining means mounted at the vertices of said L-shaped members for removably receiving said wheels;

a first substantially U-shaped member removably and adjustably attachable to said second assembly; and a second substantially U-shaped member removably attachable to said first U-shaped member, and a bar adjustably attached to said second U-shaped member;

said bar and said second U-shaped member cooperating to selectively grasp and hold said ring member by engaging said first annular, concave surface of said ring member.

14. Apparatus as in claim 13 wherein said first U-shaped member includes first and second hollow tubular receiving members of a size and shape to internally receive free ends of said second U-shaped member.

15. Apparatus as in claim 14 wherein said first U-shaped member includes first and second tubular receiving members each defining two openings in the walls thereof diametrically opposed to each other, said second U-shaped member defining an opening adjacent each free end thereof, and first and second pin elements for removable insertion through respective ones of said openings for removably attaching said first and second U-shaped members together.

16. Apparatus as in claim 15 wherein said L-shaped members are hollow tubes and the free ends of said first U-shaped member are of a size and shape to fit within said L-shaped members.

17. Apparatus as in claim 16 wherein said first U-shaped member includes a spring-loaded fastening element adjacent each free end thereof and wherein each of said L-shaped members is a hollow, tubular member which defines a first plurality of spaced apart openings for receiving said fastening elements, whereby the relative positions of said first U-shaped member and said second assembly can be adjusted.

18. Apparatus as in claim 17 wherein said first assembly includes two substantially parallel hollow tubular members of a size and shape to fit within said L-shaped members, each of said parallel members having an additional spring-loaded fastening element adjacent corresponding free ends thereof and wherein each of said L-shaped members defines a second plurality of spaced apart openings for receiving said additional fastening element, whereby the relative positions of said first and second assemblies can be adjusted.

19. Apparatus as in claim 18 further including third and fourth wheel retaining means attached to said first assembly and adjacent said attaching means for removably receiving additional wheels.

20. Apparatus as in claim 19 wherein said first assembly is unattached from said lawn mower, said second assembly is attached to said first assembly, said first and second wheels are attached to said second assembly, said first U-shaped member is attached to said second assembly, said second U-shaped member is attached to said first U-shaped member, said ring member is attached to said second U-shaped member and said bar, and further including third and fourth wheels attached to said third and fourth wheel retaining means to form a garbage cart or the like.

21. Apparatus as in claim 19 wherein said first assembly is attached to said lawn mower, said second assembly is attached to said first assembly, said first and second wheels are attached to said second assembly, and said ring member is attached to said lawn mower bag to form a leaf or lawn clippings cart to be drawn behind said lawn mower.

22. Apparatus as in claim 21 wherein said first U-shaped member is attached to said second assembly to provide a higher abutment against which said plastic or similar type of leaf or lawn clippings-receiving bag can rest.

23. Apparatus as in claim 19 wherein said first assembly is attached to said second assembly, said ring member is attached to said first assembly, said first U-shaped member is attached to said second assembly, and said first and second wheels are attached to said second assembly to form a bagging assembly for suspending said plastic or similar type of leaf or lawn clippings-receiving bag from said ring member to facilitate filling of said last-mentioned bag with leaves or grass clippings.

24. Apparatus as in claim 23 further including a rod attached to said first U-shaped member, and a lid rotatably mounted on said rod and positioned for enabling said lid to selectively contact said ring member and to close off an open end of said plastic or similar type of leaf or lawn clippings-receiving bag.

25. Apparatus as in claim 1 and further including a substantially U-shaped member and a bar adjustably attached to said U-shaped member, said bar and said U-shaped member cooperating to selectively grasp and hold said ring member by engaging said first annular, concave surface of said ring member.

26. Apparatus as in claim 25 further including a protective cover attached to and normally extending downwardly from a predetermined portion of said U-shaped member, said cover of a size to extend adjacent to said outer circumferential surface and below said second edge when said ring member is attached to said U-shaped member and said bar.

27. Apparatus as in claim 26 further including a substantially circular elastic band attached to said protective cover, said band of a size to enable said band to tightly encircle and grasp said second annular, concave surface, whereby a plastic or similar type of leaf or lawn clippings-receiving bag can be positioned and held between said band and said second annular, concave surface.

28. Apparatus as in claim 26 further including a draw-string attached to said protective cover, said draw-string of a size and adjustable to enable said draw-string to tightly encircle and grasp said second annular, concave surface, whereby a plastic or similar type of leaf or lawn clippings-receiving bag can be positioned and held between said draw-string and said second annular, concave surface.

29. Apparatus as in claim 26 further including means in operative relationship with said protective cover for selectively enabling removal of said cover from said U-shaped member.

* * * * *